(12) United States Patent
Matsumoto

(10) Patent No.: US 10,148,203 B2
(45) Date of Patent: Dec. 4, 2018

(54) MOTOR DRIVING APPARATUS INCLUDING DC LINK VOLTAGE DETECTION UNIT

(71) Applicant: FANUC CORPORATION, Yamanashi (JP)

(72) Inventor: Yasuyuki Matsumoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 113 days.

(21) Appl. No.: 14/620,763

(22) Filed: Feb. 12, 2015

(65) Prior Publication Data

US 2015/0229246 A1    Aug. 13, 2015

(30) Foreign Application Priority Data

Feb. 13, 2014    (JP) .................................. 2014-025815

(51) Int. Cl.

| | |
|---|---|
| G05B 19/4062 | (2006.01) |
| H02P 1/42 | (2006.01) |
| H02J 7/34 | (2006.01) |
| H02P 6/00 | (2016.01) |
| H02M 7/00 | (2006.01) |
| H02P 6/34 | (2016.01) |
| H02P 29/024 | (2016.01) |

(52) U.S. Cl.
CPC ............. *H02P 6/001* (2013.01); *H02M 7/003* (2013.01); *H02P 6/34* (2016.02); *H02P 29/0241* (2016.02)

(58) Field of Classification Search
CPC ....... H02P 1/426; H02J 7/345; G05B 19/4062
USPC ........................................ 318/376, 802, 805
See application file for complete search history.

(56) References Cited

U.S. PATENT DOCUMENTS

| | | | | |
|---|---|---|---|---|
| 5,723,968 A | * | 3/1998 | Sakurai ................... | H02P 23/06 187/293 |
| 2004/0130284 A1 | * | 7/2004 | Lee .......................... | H02P 6/10 318/400.23 |
| 2009/0237016 A1 | * | 9/2009 | Iwashita .................. | H02J 7/345 318/400.3 |

(Continued)

FOREIGN PATENT DOCUMENTS

| | | |
|---|---|---|
| DE | 102009060200 A1 | 7/2010 |
| JP | S60091818 A | 5/1985 |

(Continued)

OTHER PUBLICATIONS

English Abstract for German Publication No. 10 2009 060 200 A1, published Jul. 8, 2010, 1 pg.

(Continued)

*Primary Examiner* — Eduardo Colon Santana
*Assistant Examiner* — Cortez Cook
(74) *Attorney, Agent, or Firm* — Fredrikson & Byron, P.A.

(57) ABSTRACT

A motor driving apparatus of the present invention includes a converter unit configured to convert an AC voltage into a DC voltage, a DC link unit configured to smooth the DC voltage by a capacitor to generate a DC link voltage, an inverter unit configured to convert the DC link voltage into a multiphase AC voltage for motor driving, short bars configured to electrically interconnect terminals of the DC link unit and terminals of the inverter unit, and a DC link voltage detection unit configured to detect the DC link voltage. At least parts of the short bars are located between the terminals of the DC link unit and terminals of the DC link voltage detection unit.

4 Claims, 14 Drawing Sheets

(56) References Cited

U.S. PATENT DOCUMENTS

| | | | | |
|---|---|---|---|---|
| 2010/0052599 A1* | 3/2010 | Nagai | ............ | H02P 1/426 |
| | | | | 318/766 |
| 2014/0132194 A1* | 5/2014 | Okita | ............ | G05B 19/4062 |
| | | | | 318/563 |

FOREIGN PATENT DOCUMENTS

| | | | | | |
|---|---|---|---|---|---|
| JP | 2005012976 | A | | 1/2005 | |
| JP | 2005151664 | A | | 6/2005 | |
| JP | 2009225497 | A | | 10/2009 | |
| JP | 2013219875 | A | | 10/2013 | |
| JP | 5389302 | B1 | * | 1/2014 | ...... H02P 27/06 |

OTHER PUBLICATIONS

English Translation of Japanese Publication No. 2013219875, published Oct. 24, 2013, 32 pages.

English Translation of Japanese Publication No. 2005151664, published Jun. 9, 2005, 15 pages.

English Translation of Japanese Publication No. 2005012976, published Jan. 13, 2005, 20 pages.

Partial English Translation of Japanese Publication No. S60091818, published May 23, 1985, 1 page.

English abstract and machine translation for Japanese Publication No. JP 2009-225497 published Oct. 1, 2009, 11 pgs.

* cited by examiner

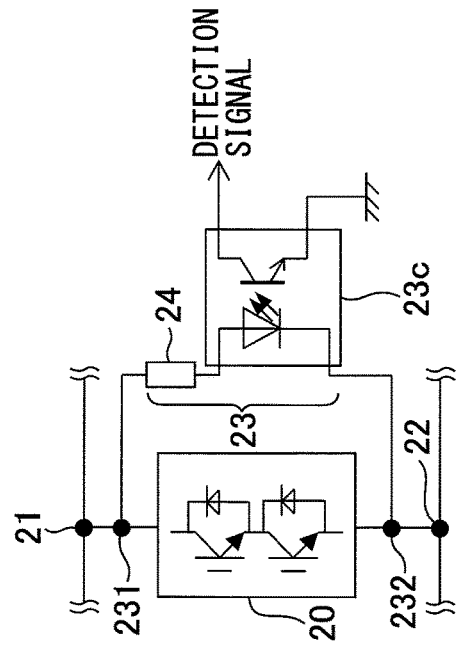
FIG. 4A
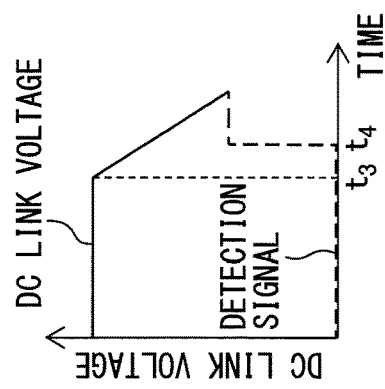
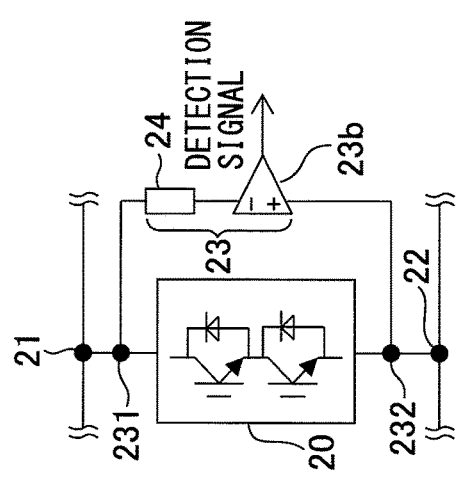
FIG. 4B
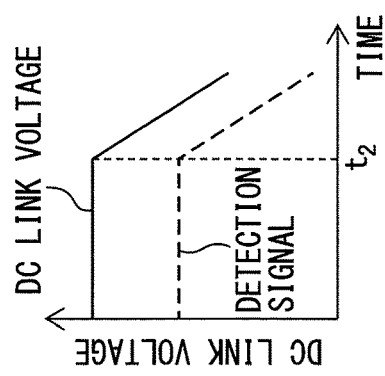
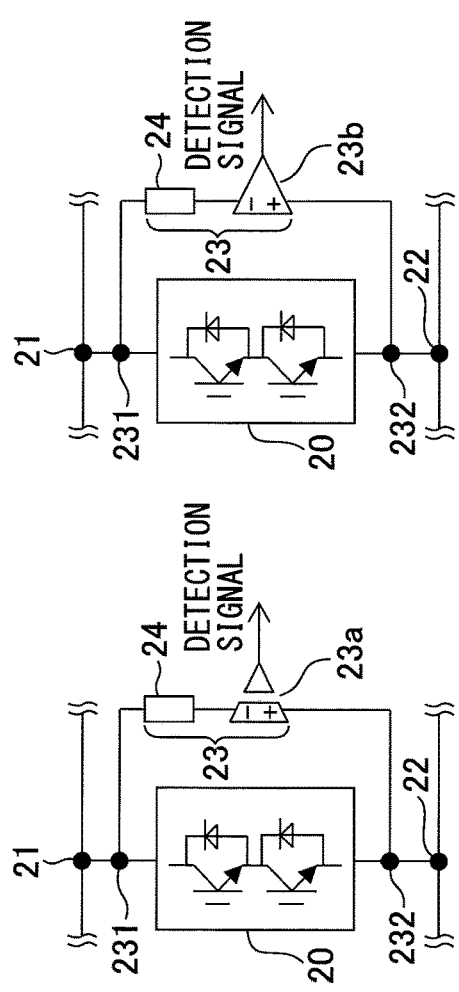
FIG. 4C
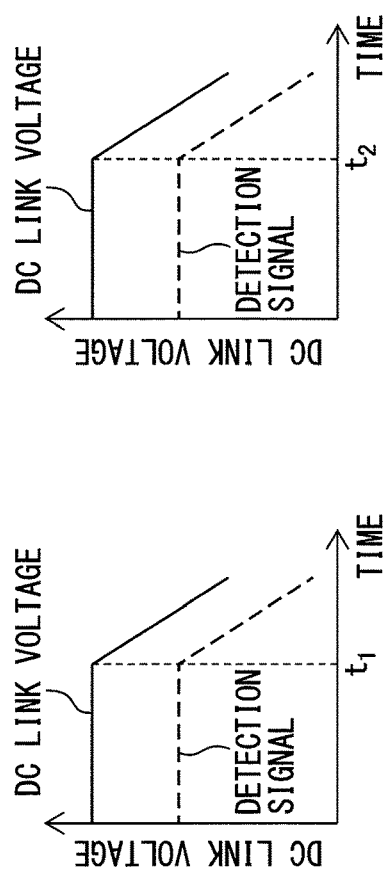

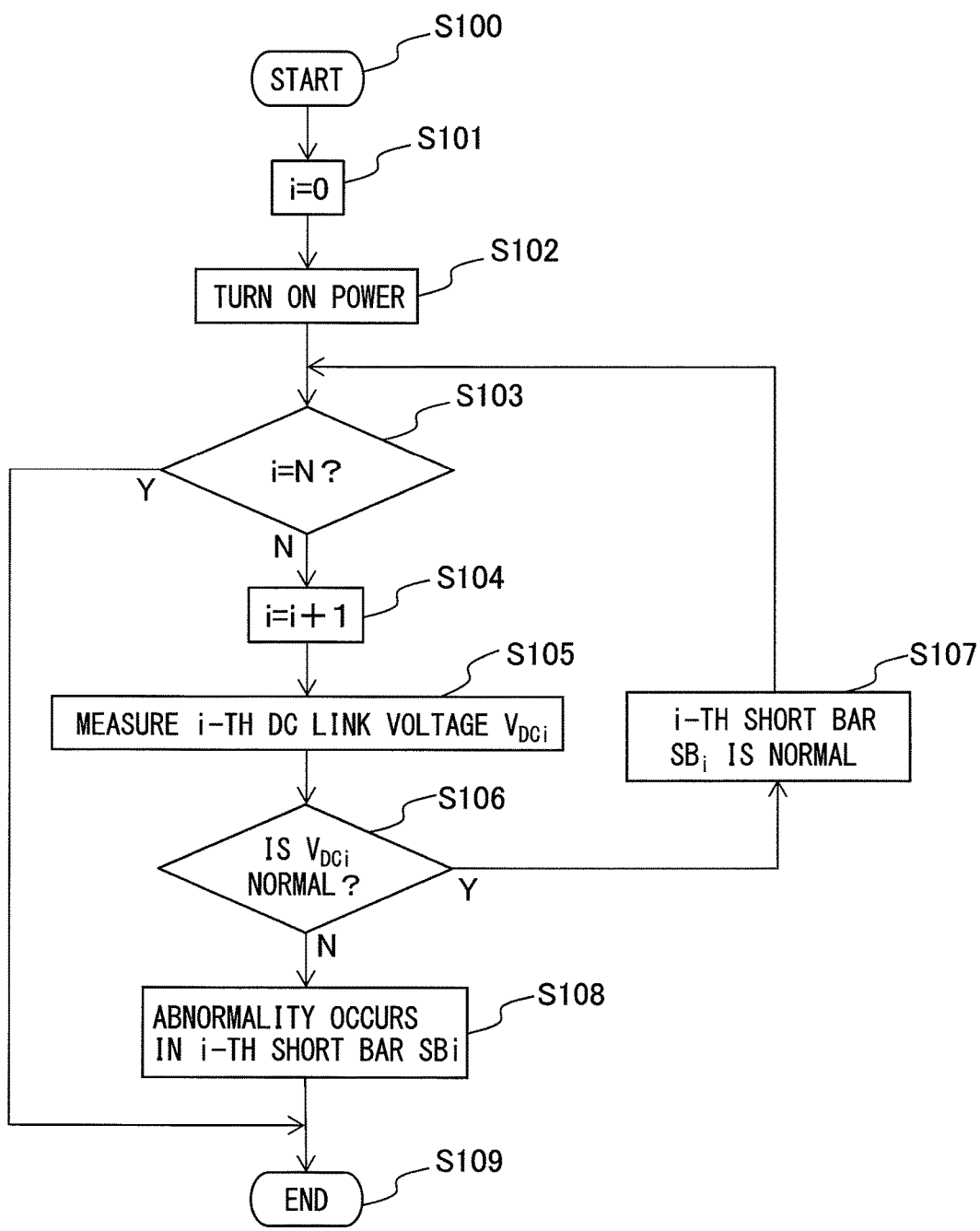

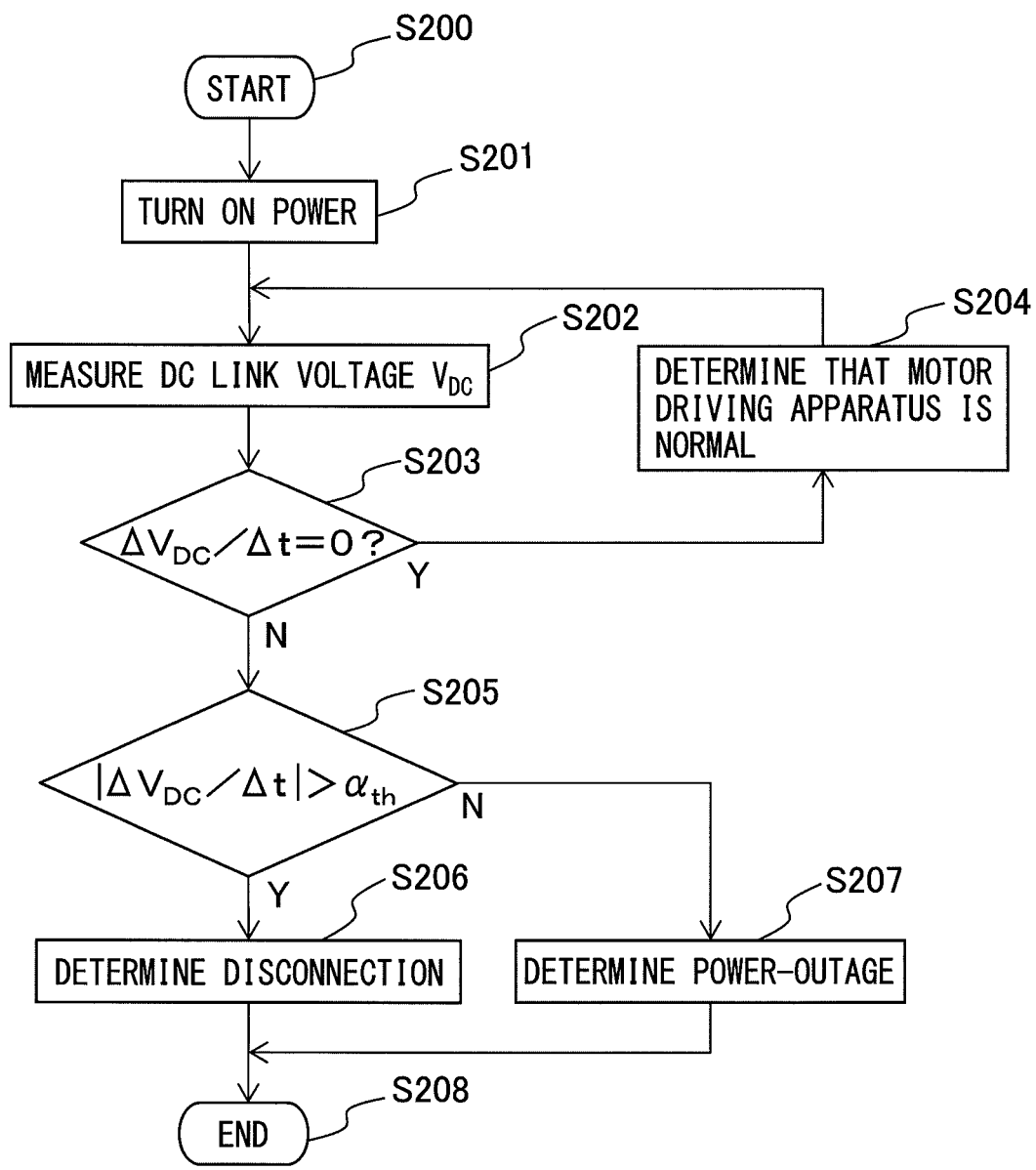

NORMAL TIME

POWER-OUTAGE TIME
(EXTERNAL FACTOR)

SHORT BAR
DISCONNECTION
(INTERNAL FACTOR)

MOTOR DRIVING APPARATUS INCLUDING DC LINK VOLTAGE DETECTION UNIT

CROSS-REFERENCE TO RELATED APPLICATIONS

This application is a new U.S. patent application that claims benefit of JP 2014-025815, filed on Feb. 13, 2014, the entire content of JP 2014-025815 is hereby incorporated by reference.

FIELD OF THE INVENTION

The present invention relates to a motor driving circuit, and more specifically to a motor driving apparatus that includes a direct-current (DC) link voltage detection unit configured to detect disconnection of a short bar for interconnecting a DC link unit and an inverter unit.

BACKGROUND OF THE INVENTION

Concerning the motor driving apparatus, there is a known configuration in which when an alternate-current (AC) voltage is converted into a DC voltage by a converter and a DC link voltage generated by a capacitor configured to smooth the DC voltage is supplied to the inverter unit, the DC link unit configured to output the DC link voltage and the inverter unit are interconnected by the short bar that is a short-circuiting component between terminals (e.g., Japanese Unexamined Patent Publication No. JP-A-2009-225497). FIG. 1 illustrates a configuration example of the conventional motor driving apparatus. In the example of the conventional motor driving apparatus 1000, two inverter units 1020 and 1030 are connected to one converter unit 1010. The converter unit 1010 includes a DC link unit (not illustrated), and output terminals 1011 and 1012 of the DC link unit are exposed to the outside. The first inverter unit 1020 includes two input terminals 1021 and 1022, and the second inverter unit 1030 includes two input terminals 1031 and 1032.

The DC link voltage from the DC link unit disposed in the converter unit 1010 is input to the first and second inverter units 1020 and 1030. In the conventional example illustrated in FIG. 1, electric connection between the converter unit 1010 and the inverter units 1020 and 1030 is carried out through short bars 1041 and 1042. In other words, the terminals 1011, 1021, and 1031 are connected through the short bar 1041, while the terminals 1012, 1022, and 1032 are connected through the short bar 1042. In such a conventional motor driving apparatus, the DC link voltage that is an inter-terminal voltage of the capacitor configured to smooth the DC voltage is measured by the DC link voltage detection unit directly connected to the smoothing capacitor.

FIG. 2 illustrates an example of a circuit diagram of the conventional motor driving apparatus. As illustrated in FIG. 2, an AC voltage from an AC power source 1001 is converted into a DC voltage by the converter unit 1010, and smoothed by the smoothing capacitor 1014 disposed in the DC link unit 1013. The smoothed DC link voltage is supplied through the short bar 1041 for connecting the terminals 1011, 1021, 1031, and 1091 and the short bar 1042 for connecting the terminals 1012, 1022 1032, and 1092 to the first inverter unit 1020, the second inverter unit 1030, and an N-th inverter unit 1090.

In the conventional motor driving apparatus 1000 illustrated in FIG. 2, the DC link voltage is detected by the DC link voltage detection unit 1015 directly connected to the terminals 1011 and 1012 of the capacitor 1014. Whether there is any abnormality of the capacitor 1014 or whether power for the AC power source 1001 has been cut can be detected by the DC link voltage detection unit 1015.

However, in the conventional motor driving apparatus, an abnormality caused by disconnection of the short bar or the like may not be detected. For example, in the short bar 1041, even when disconnection occurs at a short bar 1041a for connecting one terminal 1011 of the DC link unit 1013 to one terminal 1021 of the first inverter unit 1020, the DC link voltage detection unit 1015 may not detect a voltage applied between the terminals 1021 and 1022 of the first inverter unit 1020 because the detection unit 1015 is directly connected to the capacitor 1014. As a result, even when an abnormality occurs at the short bar 1041a that is a part of the short bar 1041, the abnormality may not be detected.

At which of a plurality of parts 1041a to 1041c and a plurality of parts 1042a to 1042c respectively constituting the short bars 1041 and 1042 abnormality has occurred may not be detected. As a result, in a real application, when disconnection occurs at a short bar in a robot or a machine tool constituting a gravity axis, a dangerous situation may occur. Specifically, an axis after the disconnected place of the short bar may fall.

As described above, in the conventional motor driving apparatus, even when abnormality occurs at the short bar for connecting the DC link unit to the inverter unit, the abnormality may not be detected.

SUMMARY OF THE INVENTION

According to an aspect of the present invention, a motor driving apparatus includes a converter unit configured to convert an AC voltage into a DC voltage, a DC link unit configured to smooth the DC voltage by a capacitor to generate a DC link voltage, an inverter unit configured to convert the DC link voltage into a multiphase AC voltage for motor driving, short bars configured to electrically interconnect terminals of the DC link unit and terminals of the inverter unit, and a DC link voltage detection unit configured to detect the DC link voltage. At least parts of the short bars are located between the terminals of the DC link unit and terminals of the DC link voltage detection unit.

In the motor driving apparatus according to the present invention, at least one terminal of the DC link voltage detection unit is preferably connected to the short bar.

Preferably, the motor driving apparatus according to the present invention further includes other inverter units electrically connected to the inverter unit via other short bars. At least parts of the other short bars are located between the terminals of the inverter unit and terminals of a DC link voltage detection unit.

In the motor driving apparatus according to the present invention, the DC link voltage detection unit preferably includes a unit configured to detect a temporal change of the DC link voltage.

Preferably, the motor driving apparatus according to the present invention further includes a DC link voltage direct detection unit directly connected to the DC link unit and configured to measure the DC link voltage, and a DC link voltage comparison unit configured to compare a measurement result of the DC link voltage direct detection unit with a measurement result of the DC link voltage detection unit.

DESCRIPTION OF THE DRAWINGS

These and other features and advantages of the present invention will be better understood by reading the following detailed description, taken together with the drawings, wherein:

FIG. 4A is a circuit diagram illustrating an example of a DC link voltage detection unit configured by a voltage-dividing resistor and an insulation amplifier, which is used in the motor driving apparatus according to the first embodiment of the present invention;

FIG. 4B is a circuit diagram illustrating an example of a DC link voltage detection unit configured by a voltage-dividing resistor and an operation amplifier, which is used in the motor driving apparatus according to the first embodiment of the present invention;

FIG. 4C is a circuit diagram illustrating an example of a DC link voltage detection unit configured by a voltage-dividing resistor and a photocoupler, which is used in the motor driving apparatus according to the first embodiment of the present invention;

FIG. 5 is a flowchart illustrating an operation procedure of the motor driving apparatus according to the first embodiment of the present invention;

FIG. 11 is a flowchart illustrating an operation procedure of the motor driving apparatus according to the fifth embodiment of the present invention;

DETAILED DESCRIPTION OF THE PREFERRED EMBODIMENTS

Hereinafter, a motor driving apparatus according to the present invention will be described with reference to the drawings. It should be noted that the technical scope of the present invention is in no way limited to embodiments, but covers the scope of the appended claims and equivalents thereof.

First Embodiment

Figure 1:
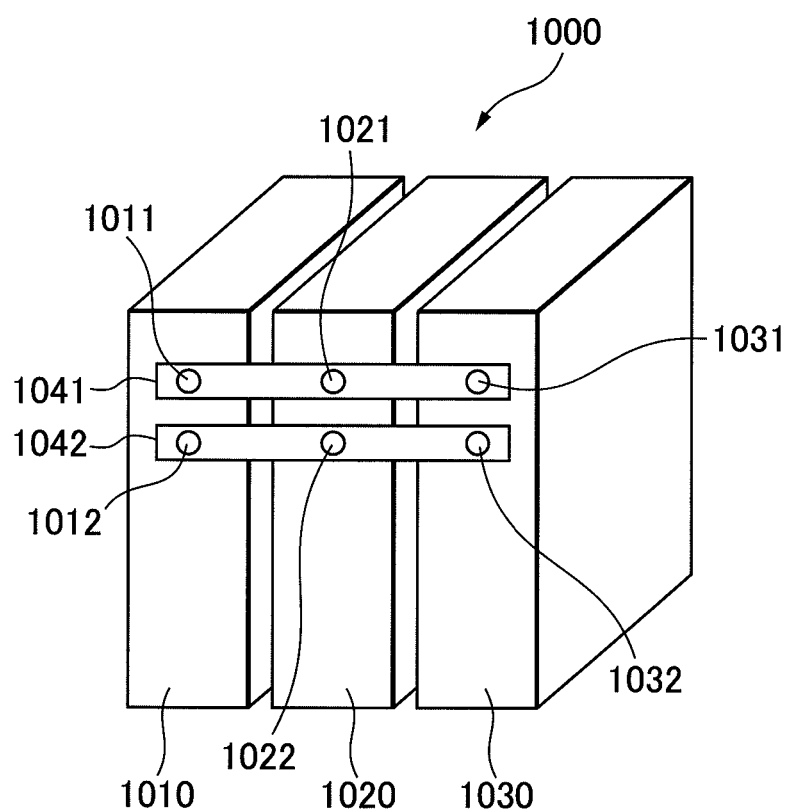
FIG. 1 is a diagram illustrating an appearance of a conventional motor driving apparatus.
Figure 2:
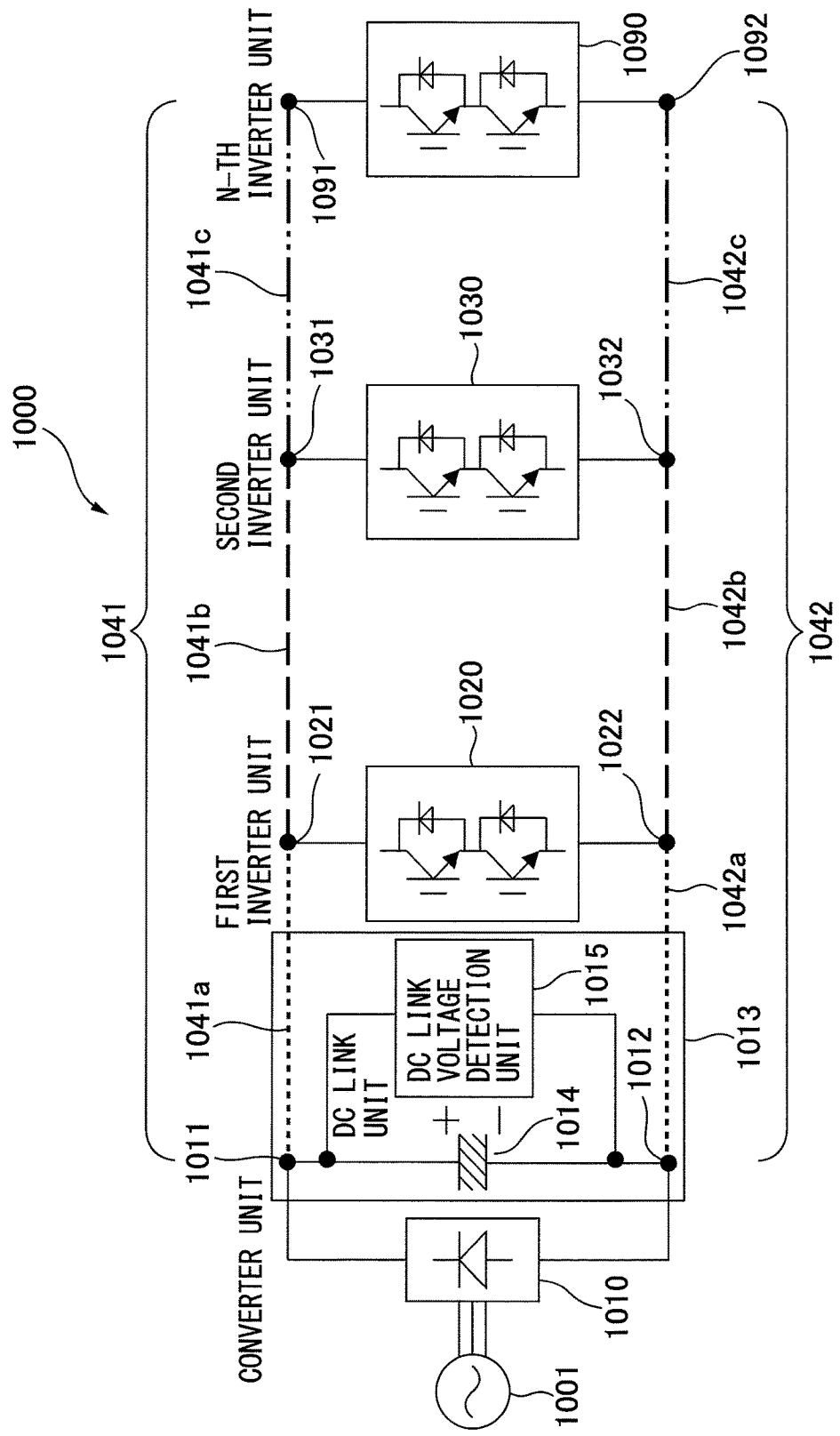
FIG. 2 is a diagram illustrating a configuration of the conventional motor driving apparatus.
Figure 3:
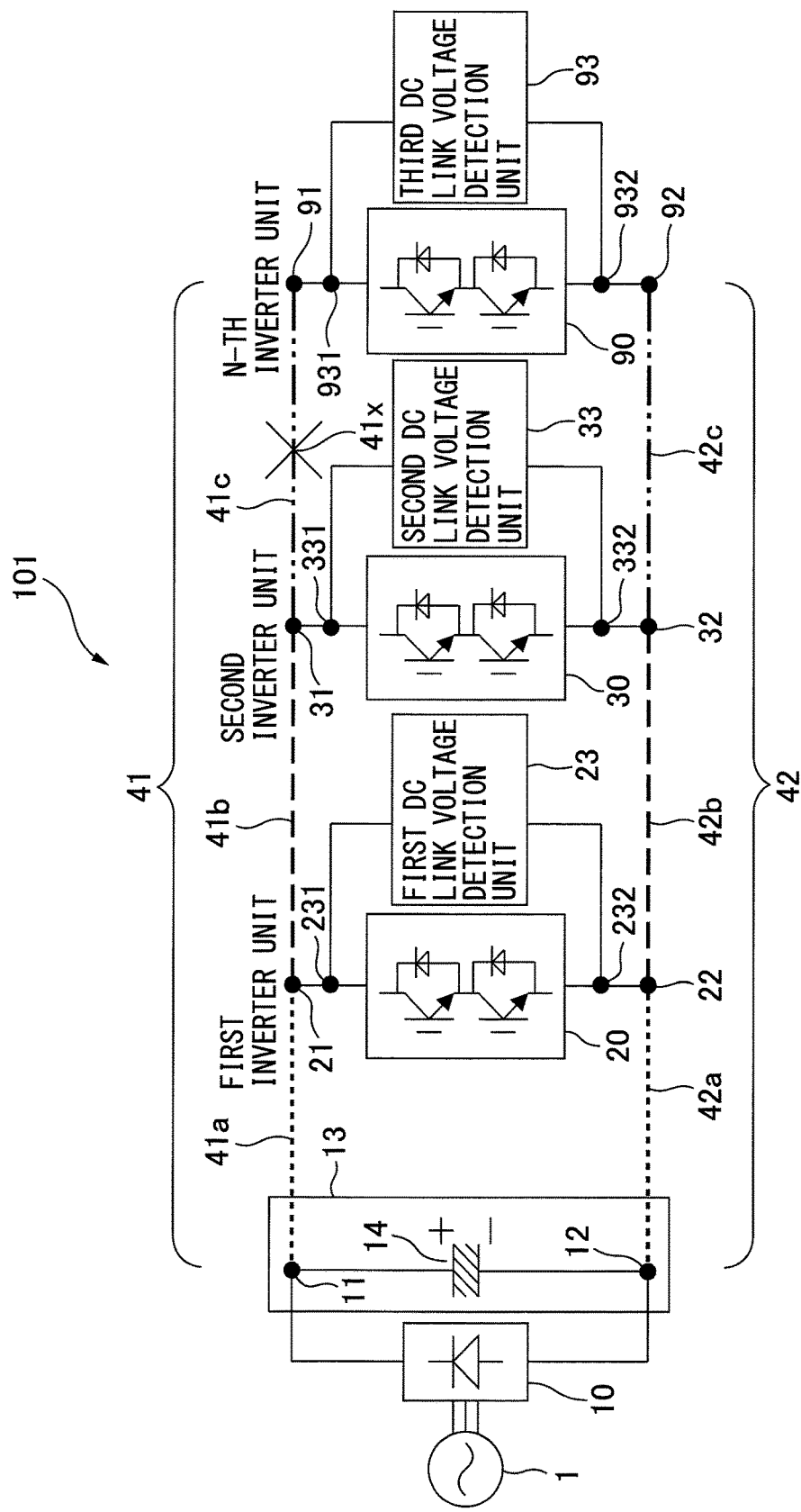
FIG. 3 is a diagram illustrating a configuration of a motor driving apparatus according to a first embodiment of the present invention.

First, a motor driving apparatus according to a first embodiment of the present invention will be described. FIG. 3 is a diagram illustrating a configuration of the motor driving apparatus according to the first embodiment of the present invention.

The motor driving apparatus 101 according to the first embodiment of the present invention includes a converter unit 10 configured to convert an AC voltage from an AC power source 1 into a DC voltage, a DC link unit 13 configured to smooth the DC voltage by a capacitor 14 and generate a DC link voltage, inverter units 20, 30, and 90 configured to convert the DC link voltage into a multiphase AC voltage for motor driving, short bars 41 and 42 configured to electrically connect terminals 11 and 12 of the DC link unit 13 to terminals 21, 22, 31, 32, 91, and 92 of the inverter units 20, 30, and 90, and DC link voltage detection units 23, 33, and 93 configured to detect the DC link voltage. At least parts of the short bars 41 and 42 are located between the terminals 11 and 12 of the DC link unit 13 and terminals 231, 232, 331, 332, 931, and 932 of the DC link voltage detection units 23, 33, and 93.

The motor driving apparatus 101 illustrated in FIG. 3 is an example where the plurality of inverter units 20, 30, and 90 is provided for one converter unit 10. The converter unit 10, the first inverter unit 20, the second inverter unit 30, and the N-th inverter unit 90 are electrically interconnected through the short bars 41 and 42. More specifically, one terminal 11 of the converter unit 10 and one terminal 21 of the first inverter unit 20 are electrically interconnected through a first part 41a of one short bar 41, while the other terminal 12 of the converter unit 10 and the other terminal 22 of the first inverter unit 20 are electrically interconnected through a first part 42a of the other short bar 42. The first DC link voltage detection unit 23 is connected to the DC link unit 13 via the parts 41a and 42a of the short bars 41 and 42. This enables detection of disconnection in the parts 41a and 42a of the short bars 41 and 42 based on a measured voltage value of the first DC link voltage detection unit 23.

Thus, the disconnection at the short bars can be detected by detecting the DC link voltage from the short bars respectively connected to the inverter units 20, 30, and 90. "Fitting of short bar and inverter unit" means a case where apparatuses are interconnected through the short bar or a case where the short bar is soldered to a printed circuit board or the short bar and the inverter unit are screwed together via the printed circuit board.

In the example illustrated in FIG. 3, the second inverter unit 30 and the N-th inverter unit 90 are provided in addition to the first inverter unit 20. The first and second inverter units 20 and 30 are electrically interconnected through the short bars 41 and 42. More specifically, one terminal 21 of the first inverter unit 20 and one terminal 31 of the second inverter unit 30 are electrically interconnected through a second part 41b of one short bar 41, while the other terminal 22 of the first inverter unit 20 and the other terminal 32 of the second inverter unit 30 are electrically interconnected through a second part 42b of the other short bar 42. A second DC link voltage detection unit 33 is disposed in the second inverter unit 30. The second DC link voltage detection unit 33 is connected to the DC link unit 13 via the parts 41a, 41b, 42a, and 42b of the short bars 41 and 42. This enables detection of disconnection in the parts 41a, 41b, 42a, and 42b of the short bars 41 and 42 based on a measured voltage value of the second DC link voltage detection unit 33. It is for a reason that a measured value is approximately 0 [V] in the DC link voltage detection unit installed in the inverter unit where the disconnection has occurred while a voltage equal to a voltage output from the DC link unit is detected in the DC link voltage detection unit installed in the inverter unit where no disconnection has occurred.

Using both the first and second DC link voltage detection units 23 and 33 enables detection as to at least at which of the first parts 41a and 42a of the short bars 41 and 42 for connecting the DC link unit 13 and the inverter unit 20 or at least at which of the second parts 41b and 42b of the short bars 41 and 42 for connecting the first inverter unit 20 and the second inverter unit 30 disconnection of the short bars 41 and 42 has occurred.

Other inverters can be connected in addition to the second inverter unit 30 so that a total number N of inverters can be connected. By providing the N-th DC link voltage detection unit 93 in the N-th inverter unit 90 as illustrated in FIG. 3, at which part of the short bars 41 and 42 disconnection has occurred can be specified.

FIGS. 4A to 4C are diagrams each illustrating a specific configuration of the DC link voltage detection unit. FIG. 4A illustrates an example of the first DC link voltage detection unit 23 configured by a voltage-dividing resistor 24 and an insulation amplifier 23a. FIG. 4A also illustrates a measurement example of a DC link voltage. For example, when the DC link voltage constant until time $t_1$ as indicated by a solid line steeply falls at the time $t_1$, a detection signal of the insulating amplifier 23a changes as indicated by a dotted line. Presence of short bar disconnection or the like can be detected based on the change of the detection signal.

FIG. 4B illustrates an example of the first DC link voltage detection unit 23 configured by the voltage-dividing resistor 24 and an operation amplifier 23b. FIG. 4B also illustrates a measurement example of a DC link voltage. For example, when the DC link voltage constant until time $t_2$ as indicated by a solid line steeply falls at the time $t_2$, a detection signal of the operation amplifier 23b changes as indicated by a dotted line. Presence of short bar disconnection or the like can be detected based on the change of the detection signal.

FIG. 4C illustrates an example of the first DC link voltage detection unit 23 configured by the voltage-dividing resistor 24 and a photocoupler 23c. FIG. 4C also illustrates a measurement example of a DC link voltage. For example, when the DC link voltage constant until time $t_3$ as indicated by a solid line steeply falls at time $t_3$, a detection signal of the photocoupler 23c changes at time $t_4$ as indicated by a dotted line. Presence of short bar disconnection or the like can be detected based on the change of the detection signal.

As illustrated in FIG. 3, when N inverter units are serially connected to one converter unit 10, by disposing a DC link voltage detection unit in each of the N inverter units, whether disconnection has occurred in the short bars 41a and 42a for connecting the converter unit 10 and the first inverter unit 20 or whether disconnection has occurred in the short bars 41b, 42b, 41c, and 42c for connecting the inverter units after the first inverter unit 20 can be detected. A disconnection detection method in this case will be described referring to a flowchart of FIG. 5.

FIG. 5 is a flowchart illustrating the short bar disconnection detection method, which uses the motor driving apparatus according to the first embodiment of the present invention. First, in step S101, a number i indicating a position of the inverter unit is set to 0, i.e., i=0. In step S102, power is turned ON for the motor driving apparatus, and a DC link voltage is output from the DC link unit 13.

In step S103, whether the number i is N is determined. In the case of i=N, measurement has been completed at the DC link voltage detection unit of the N-th inverter unit, and thus detection of short bar disconnection is ended in step S109. On the other hand, when not i=N (i<N), in step S104, the number i is incremented by 1. Then, in step S105, an i-th DC link voltage $V_{DCi}$ is detected by an i-th DC link voltage detection unit at an i-th inverter unit. For example, in the case of i=1, a first DC link voltage $V_{DC1}$ at the first inverter unit 20 is measured by the first DC link voltage detection unit 23 of the first inverter unit 20. This voltage is a voltage of the DC link unit 13 measured via the first short bars 41a and 42a. Thus, presence of abnormality at the first short bars 41a and 42a can be detected based on whether the measured DC link voltage is a normal value.

In step S106, whether the i-th DC link voltage $V_{DCi}$ is normal is determined. This determination can be made based on whether the measured value $V_{DCi}$ is within a predetermined range ($V_0 - \Delta V_0 < V_{DCi} < V_0 + \Delta V_0$) from a predetermined reference value $V_0$. When the i-th DC link voltage $V_{DCi}$ is determined to be normal (YES in step S106), in step S107, an i-th short bar $SB_i$ is determined to be normal. In this case, in order to measure DC link voltages at the inverter units after the i-th, the processing returns to step S103 to continue the measurement.

On the other hand, when the i-th DC link voltage $V_{DCi}$ is not determined to be normal (NO in step S106), in step S108, it is determined that an abnormality has occurred at the i-th short bar $SB_i$. For example, when a first short bar $SB_1$ (i=1) to (m-1)-th short bar $SB_{m-1}$ (i=m-1) are determined to be normal while it is determined that an abnormality has occurred at a m-th short bar $SB_m$ (i=m), it can be determined that an abnormality has occurred at the m-th short bar $SB_m$ for connecting a (m-1)-th inverter unit and a m-th inverter unit. In this case, abnormality at short bars after the (m+1)-th short bar for connecting the inverter units after the (m+1)-th inverter unit may not be detected. Thus, the measurement is ended in step S109.

Thus, when the plurality of inverter units is serially connected through the short bars to the converter unit 10, by disposing the DC link voltage detection unit in each inverter unit, disconnection in the short bar connected to any one of the inverter units can be detected.

Second Embodiment

Figure 6:
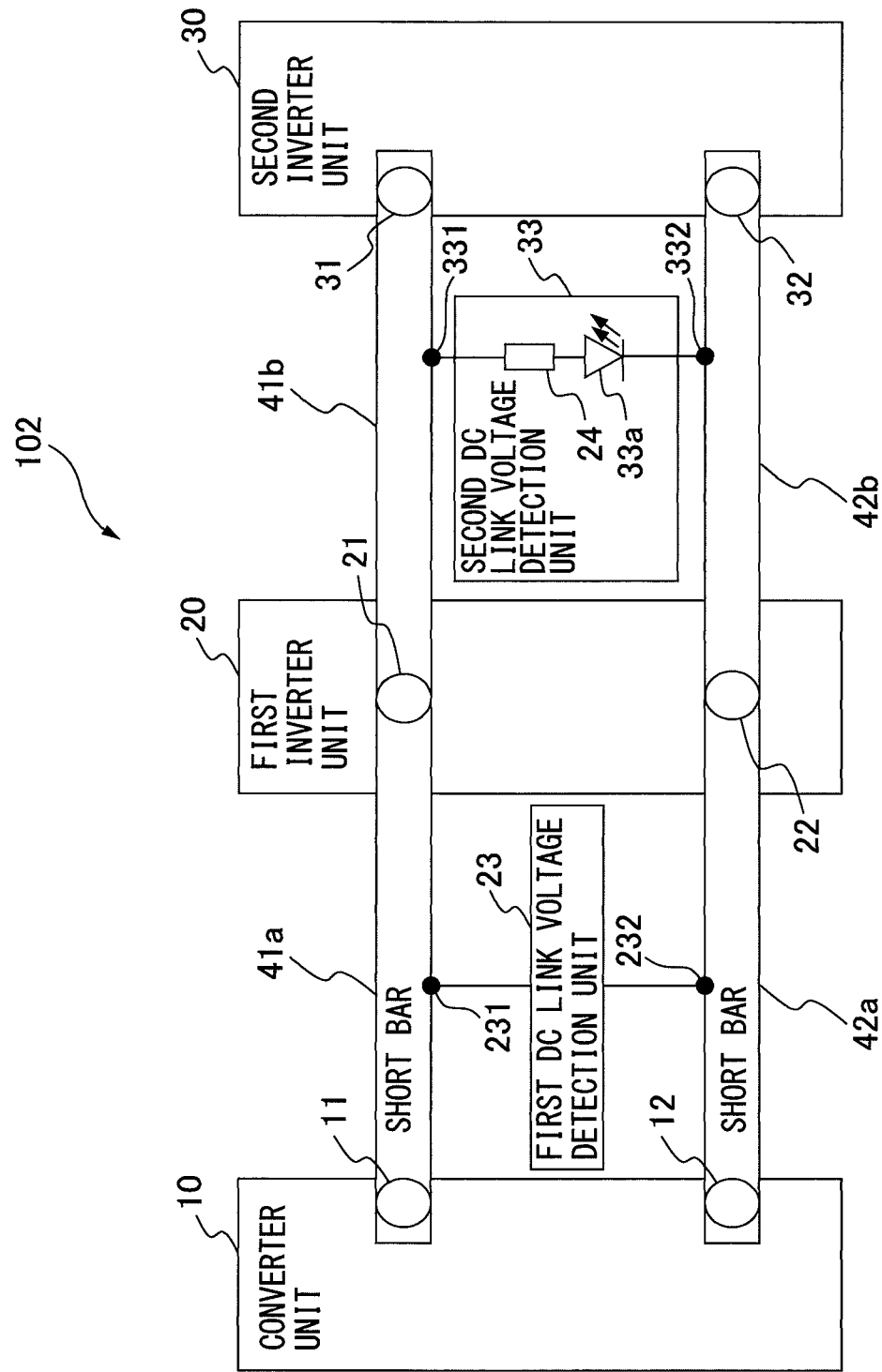
FIG. 6 is a diagram illustrating a configuration of a motor driving apparatus according to a second embodiment of the present invention.

Next, a motor driving apparatus according to a second embodiment of the present invention will be described referring to the drawing. FIG. 6 is a diagram illustrating a configuration of the motor driving apparatus 102 according to the second embodiment of the present invention. Components similar to those of the motor driving apparatus 101 according to the first embodiment are denoted by similar reference numerals, and detailed description thereof will be omitted. The motor driving apparatus 102 according to the second embodiment is different from the motor driving apparatus 101 according to the first embodiment in that at least one terminal (231 or 232) of a first DC link voltage detection unit 23 is connected to short bars 41a and 42a (or 41b and 42b).

In an example illustrated in FIG. 6, one terminal 231 of the first DC link voltage detection unit 23 is connected to the short bar 41a, and the other terminal 232 is connected to the short bar 42a. The terminals 231 and 232 can be respectively connected to the short bars 41a and 42a by using detachable members such as clips. In this case, the DC link voltage detection unit can be easily connected to a desired short bar. For example, as illustrated in FIG. 6, two DC link voltage detection units 23 and 33 can be respectively connected to the short bars. However, only the first DC link voltage detection unit 23 may be used, and the first DC link voltage detection unit 23 connected to the short bars 41a and 42a may be removed to be connected to short bars 41b and 42b.

Thus, disconnection at a short bar at a desired position can be easily detected by detachably connecting the DC link voltage detection unit to an arbitrary short bar.

Third Embodiment

Figure 7:
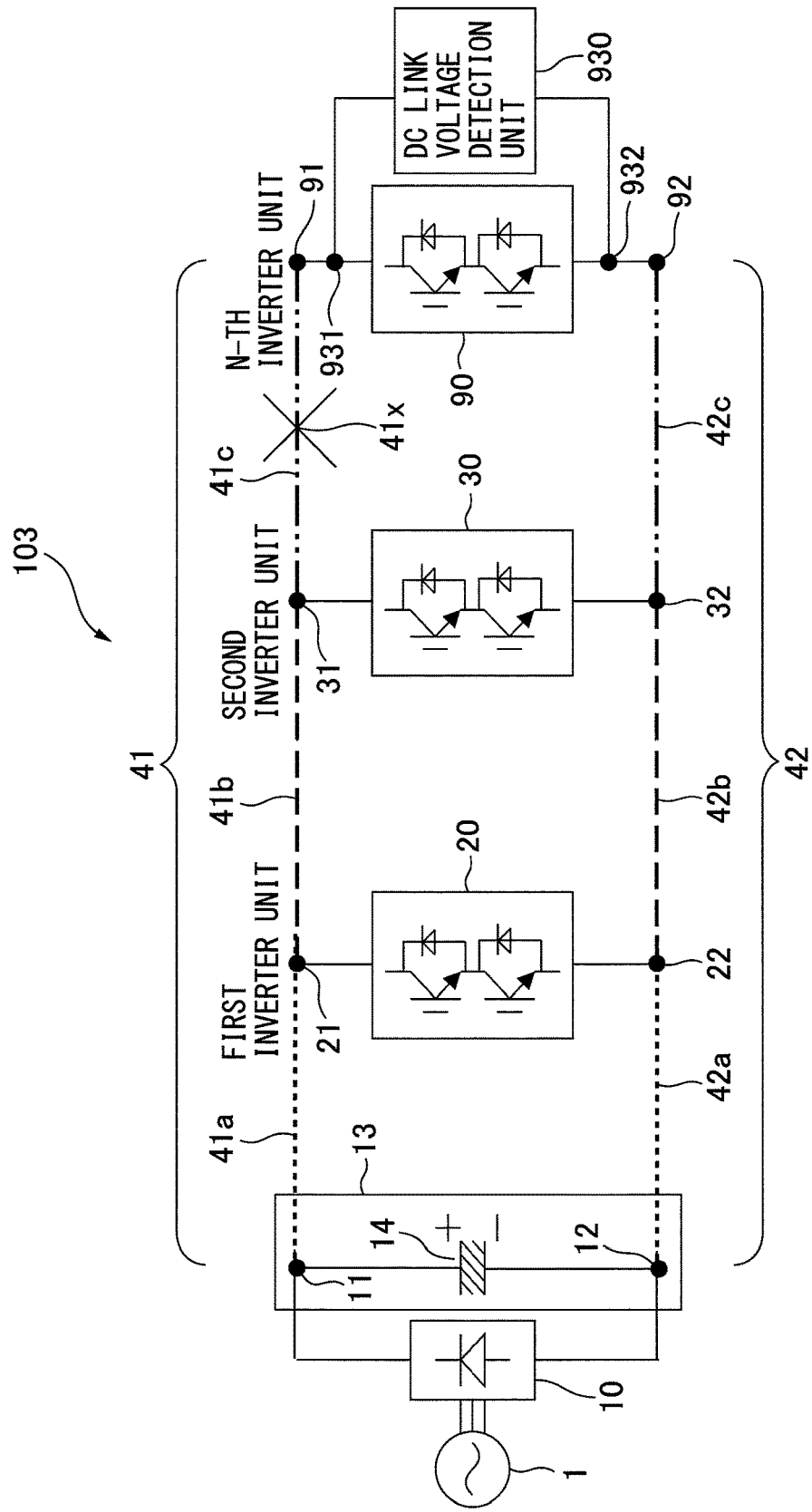
FIG. 7 is a diagram illustrating a configuration of a motor driving apparatus according to a third embodiment of the present invention.

Next, a motor driving apparatus according to a third embodiment of the present invention will be described referring to the drawing. FIG. 7 is a diagram illustrating a configuration of the motor driving apparatus 103 according to the third embodiment of the present invention. Components similar to those of the motor driving apparatus 101 according to the first embodiment are denoted by similar reference numerals, and detailed description thereof will be omitted. The motor driving apparatus 103 according to the third embodiment is different from the motor driving apparatus 101 according to the first embodiment in that other inverter units 30 and 90 electrically connected to a first inverter unit 20 via short bars 41b, 42b, 41c, and 42c are provided and at least parts of the short bars 41b, 42b, 41c, and 42c are arranged between terminals 21 and 22 of the first inverter unit 20 and terminals 931 and 932 of a DC link voltage detection unit 930.

In the motor driving apparatus according to the third embodiment, pluralities of short bars 41a to 41c and 42a to 42c are provided between terminals 11 and 12 of a DC link unit 13 and the terminals 931 and 932 of the DC link voltage detection unit 930. Accordingly, even when disconnection occurs at any one of positions of the plurality of short bars, the DC link voltage detection unit 930 can detect the disconnection. In this case, though the disconnection position of any one of the plurality of short bars may not be specified, by using only one DC link voltage detection unit, if a measured DC link voltage is normal, no disconnection in any of the plurality of short bars can be detected. As a result, no disconnection in any of the short bars of the motor driving apparatus can be quickly detected. When a DC link voltage is first measured at an inverter unit of a last stage and abnormality is detected, a disconnection position can be specified by shifting a measuring position toward the converter unit side.

For example, when it is supposed that disconnection has occurred at one point 41x of the short bar 41c as illustrated in FIG. 7, by providing the DC link voltage detection unit 930 in the N-th inverter unit 90, disconnection at the short bar 41 or 42 can be detected. At this stage, a disconnection position of any of the short bars 41a to 41c and 42a to 42c may not be specified. When a DC link voltage detection unit (not illustrated) is installed at the second inverter unit 30 and a DC link voltage is detected, supposing that disconnection has occurred only at the point 41x, the measured DC link voltage exhibits a normal value. As a result, disconnection at any one of the short bars 41c and 42c for connecting the second inverter unit 30 and the N-th inverter unit 90 can be detected.

Thus, by detecting the DC link voltage via the plurality of short bars, no disconnection in any of the plurality of short bars can be easily detected.

Fourth Embodiment

Figure 8:
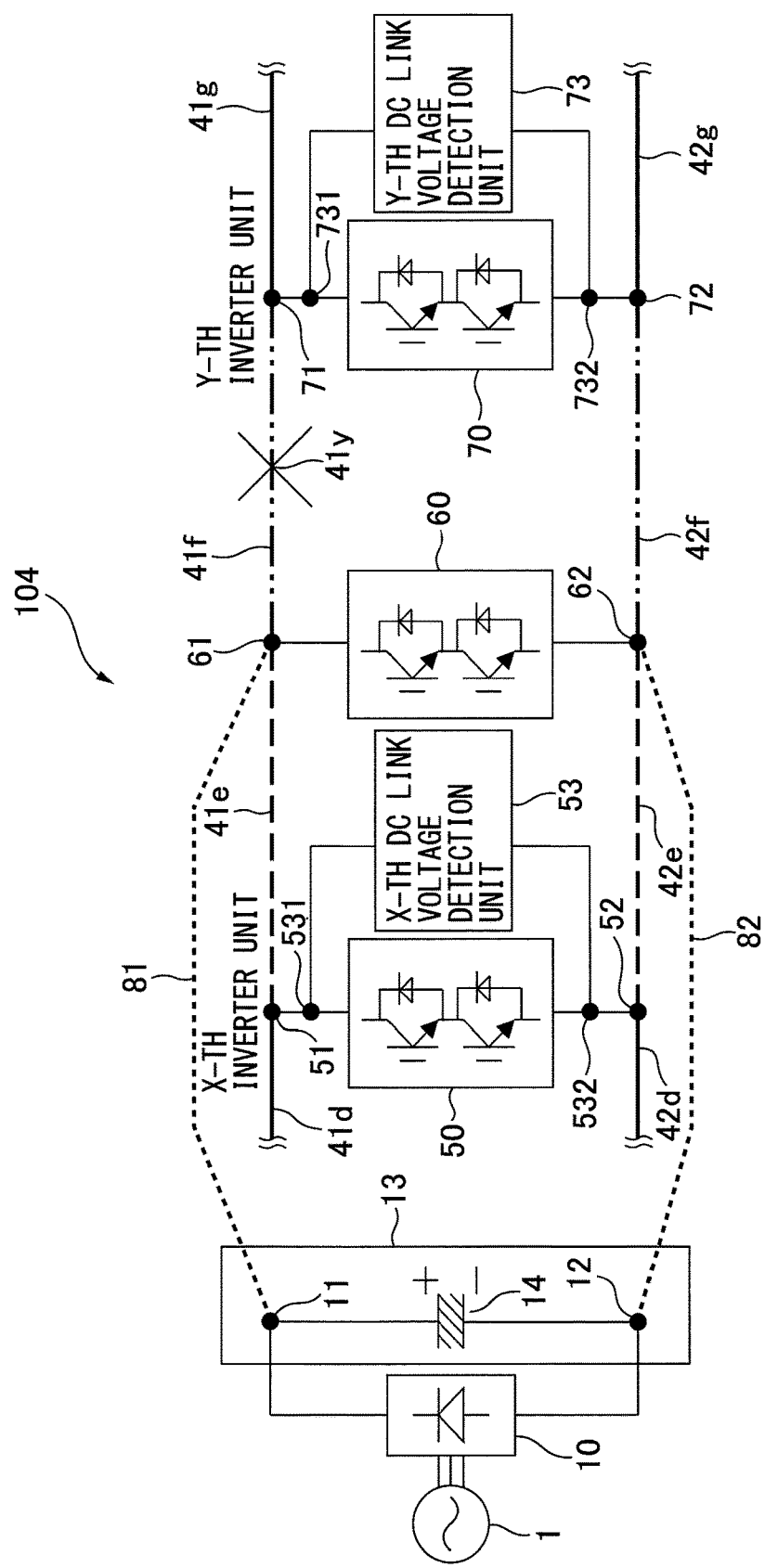
FIG. 8 is a diagram illustrating a configuration of a motor driving apparatus according to a fourth embodiment of the present invention.

Next, a motor driving apparatus according to a fourth embodiment of the present invention will be described referring to the drawing. FIG. 8 is a diagram illustrating a configuration of the motor driving apparatus 104 according to the fourth embodiment of the present invention. Components similar to those of the motor driving apparatus 101 according to the first embodiment are denoted by similar reference numerals, and detailed description thereof will be omitted. The motor driving apparatus 104 according to the fourth embodiment is different from the motor driving apparatus 101 according to the first embodiment in that an output voltage of a DC link 13 is input to, in place of a first inverter (not illustrated), input terminals 61 and 62 of a Z-th inverter unit 60 disposed between X-th and Y-th inverter units 50 and 70, an X-th DC link voltage detection unit 53 is provided in the X-th inverter unit 50, and a Y-th DC link voltage detection unit 73 is provided in the Y-th inverter unit 70. As illustrated in FIG. 8, in the motor driving apparatus 104 according to the fourth embodiment, a plurality of inverter units 50, 60, and 70 is interconnected through short bars 41e and 41f and 42e and 42f. Terminals 61 and 62 of the inverter unit 60 located at a center of the three continuous inverter units are connected to terminals 11 and 12 of the DC link unit 13 through wiring lines 81 and 82. DC link voltage detection units 53 and 73 are connected to the inverter units 50 and 70 adjacent to the inverter unit 60 located at the center. Disconnection at the short bars 41e and 41f and 42e and 42f is detected. For example, when disconnection occurs at a point 41y of the short bar 41f between the inverter units 60 and 70, the disconnection can be detected by the Y-th DC link voltage detection unit 73 disposed in the Y-th inverter unit 70.

Setting the wiring lines 81 and 82 to be movable enables connection of the terminals 11 and 12 of the DC link unit 13 to a terminal of an arbitrary inverter unit, and providing a DC link voltage detection unit in an inverter unit adjacent thereto enables detection of short bar disconnection. In this case, there is no need to provide any DC link voltage detection unit in the inverter unit to which the terminals 11 and 12 of the DC link unit 13 are connected. Thus, a position of short bar disconnection can be decided without providing any DC link voltage detection unit in all the inverter units unlike the motor driving apparatus according to the first embodiment.

Fifth Embodiment

Figure 9:
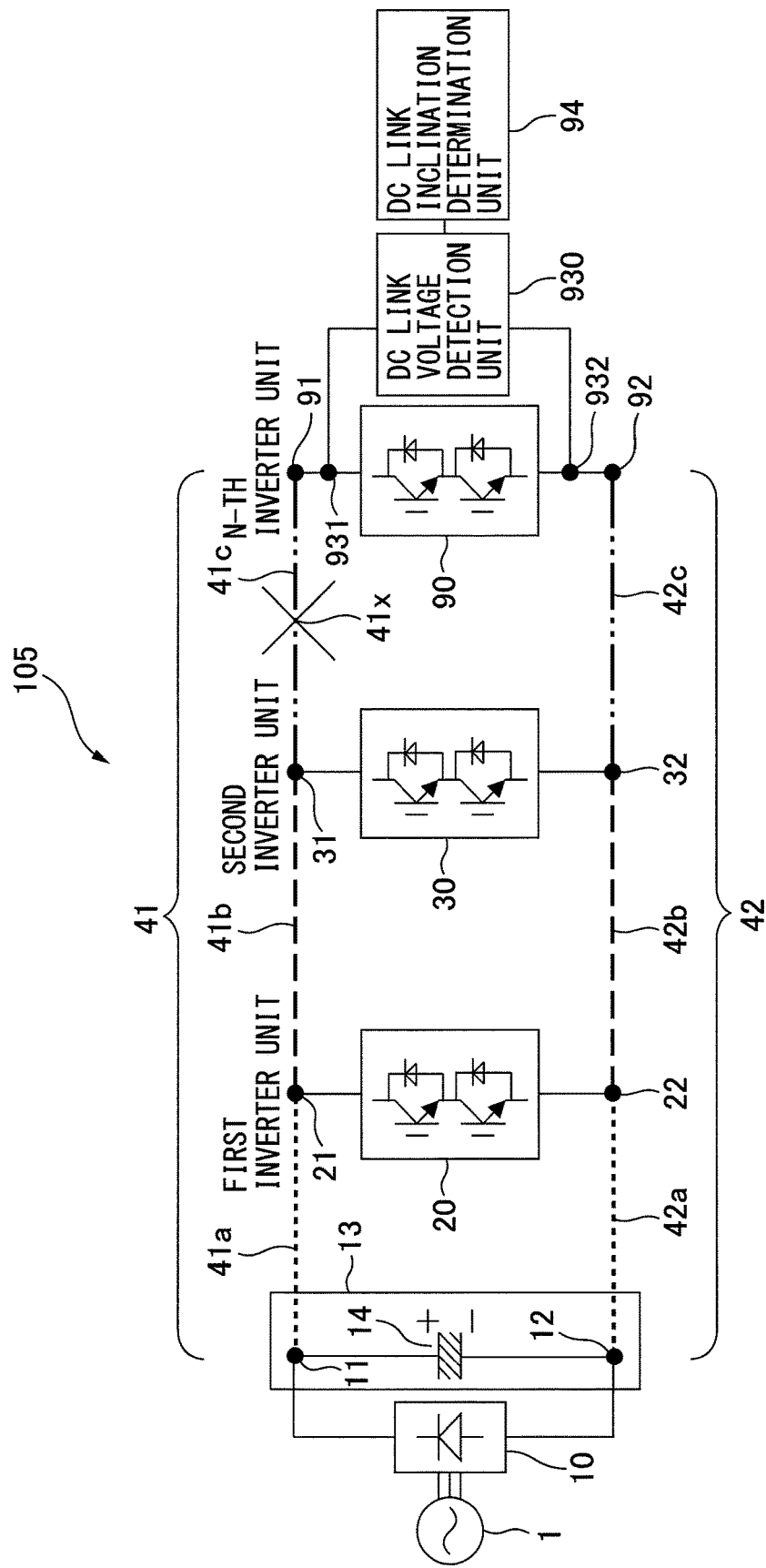
FIG. 9 is a diagram illustrating a configuration of a motor driving apparatus according to a fifth embodiment of the present invention.

Next, a motor driving apparatus according to a fifth embodiment of the present invention will be described referring to the drawings. FIG. 9 is a diagram illustrating a configuration of the motor driving apparatus 105 according to the fifth embodiment of the present invention. Components similar to those of the motor driving apparatus 103 according to the third embodiment are denoted by similar reference numerals, and a detailed description thereof will be omitted. The motor driving apparatus 105 according to the fifth embodiment is different from the motor driving apparatus 103 according to the third embodiment in that a DC link voltage detection unit 930 includes a unit configured to detect a temporal change of a DC link voltage.

In the motor driving apparatus 105 according to the fifth embodiment illustrated in FIG. 9, the DC link voltage detection unit 930 further includes a DC link inclination determination unit 94 configured to detect the temporal change of the DC link voltage.

The DC link inclination determination unit 94 can determine, based on the temporal change of the DC link voltage detected by the DC link voltage detection unit 930, in which one of states, namely, (A) a normally operated state ("normal time"), (B) a power-outage state of an AC power source, and (C) a short bar disconnected state, the apparatus is.

Figure 10A:
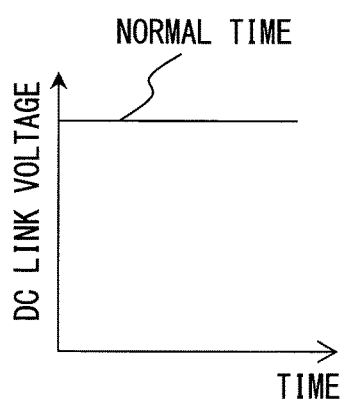
FIG. 10A is a graph depicting a temporal change of a DC link voltage at normal time in the motor driving apparatus according to the fifth embodiment of the present invention.
Figure 10B:
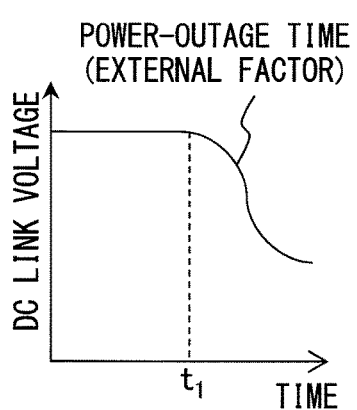
FIG. 10B is a graph depicting a temporal change of a DC link voltage at power-outage time in the motor driving apparatus according to the fifth embodiment of the present invention.
Figure 10C:
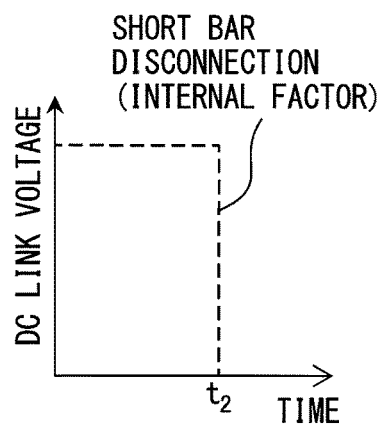
FIG. 10C is a graph depicting a temporal change of a DC link voltage at short bar disconnection time in the motor driving apparatus according to the fifth embodiment of the present invention.

FIGS. 10A to 10C are graphs each depicting an example of the temporal change of the DC link voltage. FIG. 10A depicts a state where an AC power source 1 illustrated in FIG. 9 and the motor driving apparatus 105 are normally operated ("normal time"). The DC link voltage detected by the DC link voltage detection unit 930 exhibits a constant value irrespective of a passage of time. The DC link inclination determination unit 94 detects a change $\Delta V_{DC}$ of the DC link voltage at predetermined minute time $\Delta t$, and can determine that the AC power source 1 and the motor driving apparatus 105 are normally operated when the temporal change $\Delta V_{DC}/\Delta t$ of the DC link voltage is 0, i.e., $\Delta V_{DC}/\Delta t=0$.

FIG. 10B depicts the temporal change of the DC link voltage when power is cut for the AC power source 1 due to an external factor. For example, when power is cut at time $t_1$, a voltage applied to a capacitor 14 of a DC link unit 13 is gradually discharged, and accordingly the temporal change of the DC link voltage may be gentler than that when short bar disconnection occurs. As a result, when an absolute value of the temporal change $\Delta V_{DC}/\Delta t$ of the DC link voltage $V_{DC}$ at the time $t_1$ is smaller than a predetermined threshold value $\alpha_{th}$, a threshold value $\alpha_{th}$ enabling determination of power-outage can be set. In other words, in the case of $|\Delta V_{DC}/\Delta t| \leq \alpha_{th}$, it can be determined that power has been cut.

FIG. 10C depicts the temporal change of the DC link voltage caused by an internal factor of the motor driving apparatus 105, in other words, when short bar disconnection occurs. For example, when disconnection occurs at one point 41x of the short bar 41c illustrated in FIG. 9 at time $t_2$, the DC link voltage detected by the DC link voltage detection unit 930 steeply falls to 0 [V] at the time $t_2$. In this case, an absolute value of the temporal change $\Delta V_{DC}/\Delta t$ of the DC link voltage $V_{DC}$ at the time $t_2$ is very large. Thus, in this case, by using a threshold value $\alpha_{th}$ set to an appropriate value, it can be determined that short bar disconnection has occurred in the case of $|\Delta V_{DC}/\Delta t| > \alpha_{th}$.

An operation procedure of the motor driving apparatus according to the fifth embodiment will be described in detail referring to a flowchart of FIG. 11. First, in step S201, power is turned ON for the AC power source 1 illustrated in FIG. 9 to activate the motor driving apparatus 105. In step S202, a DC link voltage $V_{DC}$ is measured by using the DC link voltage detection unit 930.

Then, in step S203, by using the DC link inclination determination unit 94, a temporal change $\Delta V_{DC}/\Delta t$ of the DC link voltage $V_{DC}$ is calculated to determine whether $\Delta V_{DC}/\Delta t = 0$ has been set. Specifically, a first measured value $\Delta V_{DC1}$ is stored in a memory, second measurement is carried out after the time $\Delta t$, and a changing amount $\Delta V_{DC} = V_{DC2} - V_{DC1}$ of $V_{DC}$ at the time $\Delta t$ is calculated by using the measured value $V_{DC2}$. Thereafter, similarly, changing an amount of the DC link voltage at i-th measurement is calculated as $\Delta V_{DC} = V_{DC(i+1)} - V_{DCi}$. The temporal change $\Delta V_{DC}/\Delta t$ is calculated by using the changing amount $\Delta V_{DC}$ of the DC link voltage thus calculated.

When the DC link inclination determination unit 94 determines that $\Delta V_{DC}/\Delta t = 0$ has been set (YES in step S203), in step S204, it is determined that the motor driving apparatus 105 is normally operated. Then, returning to step S202, the measurement of the DC link voltage after the time $\Delta t$ is continued.

On the other hand, when the DC link inclination determination unit 94 determines that $\Delta V_{DC}/\Delta t$ is not equal to 0 (NO in step S203), it is determined that abnormality of some kind has occurred, and which of short bar disconnection and power-outage of the AC power source has caused the abnormality is determined. In other words, in step S205, whether an absolute value of the temporal change $\Delta V_{DC}/\Delta t$ of the DC link voltage exceeds the predetermined threshold value $\alpha_{th}$, in other words, $|\Delta V_{DC}/\Delta t| > \alpha_{th}$, is determined.

When the DC link inclination determination unit 94 determines that $|\Delta V_{DC}/\Delta t| > \alpha_{th}$ has been set (YES in step S205), it means that the temporal change of the DC link voltage is steep. Thus, in step S206, it is determined that short bar disconnection has occurred. Then, in step S208, the detection of the DC link voltage is ended.

On the other hand, when the DC link inclination determination unit 94 determines that $|\Delta V_{DC}/\Delta t| \leq \alpha_{th}$ has been set (NO in step S205), it means that the temporal change of the DC link voltage is smaller than that when the short bar disconnection occurs. Thus, in step S207, it is determined that power has been cut for the AC power source. Then, in step S208, the detection of the DC link voltage is ended.

As described above, according to the motor driving apparatus of the fifth embodiment, the temporal change of the DC link voltage is detected by the DC link inclination determination unit 94, and thus whether any abnormality causing the DC link voltage to fluctuate has occurred can be determined. When it is determined that abnormality causing the DC link voltage to fluctuate has occurred, which of disconnection at the short bar for connecting the DC link unit and the inverter unit and power-outage for the AC power source has caused the abnormality can be determined.

The motor driving apparatus may further include a warning generator for reporting, when the DC link inclination determination unit has detected abnormality, contents of the abnormality or a display for displaying the contents of the abnormality.

Sixth Embodiment

Figure 12:
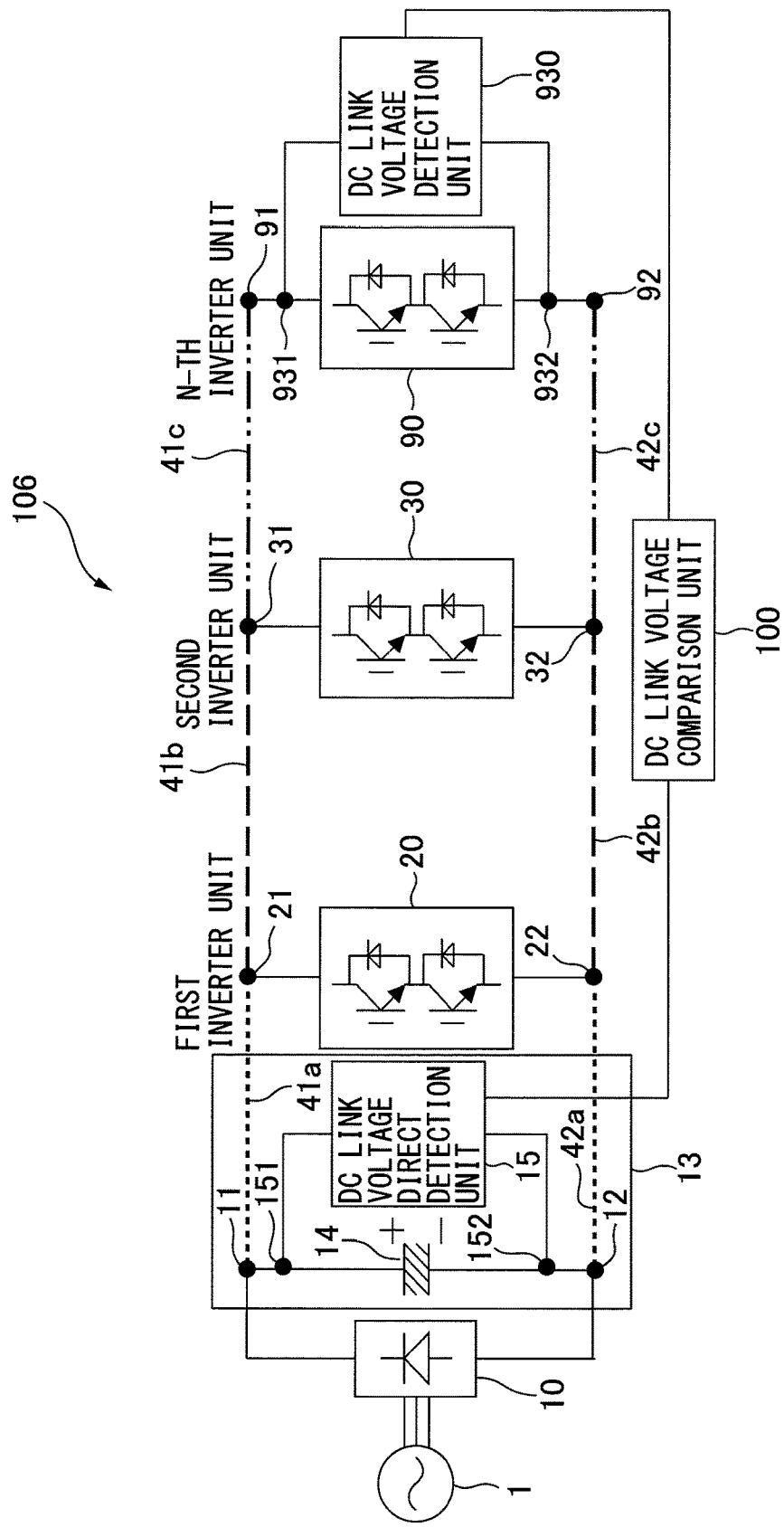
FIG. 12 is a diagram illustrating a configuration of a motor driving apparatus according to a sixth embodiment of the present invention.

Next, a motor driving apparatus according to a sixth embodiment of the present invention will be described referring to the drawings. FIG. 12 is a diagram illustrating a configuration of the motor driving apparatus 106 according to the sixth embodiment of the present invention. Components similar to those of the motor driving apparatus 103 according to the third embodiment are denoted by similar reference numerals, and detailed description thereof will be omitted. The motor driving apparatus 106 according to the sixth embodiment is different from the motor driving apparatus 103 according to the third embodiment in that the apparatus further includes a DC link voltage direct detection unit 15 directly connected to a DC link unit 13 and configured to detect a DC link voltage and an DC link voltage comparison unit 100 configured to compare a measurement result of the DC link voltage direct detection unit 15 with that of a DC link voltage detection unit 930.

As illustrated in FIG. 12, the DC link voltage direct detection unit 15 is installed in the DC link unit 13, and terminals 151 and 152 of the DC link voltage direct detection unit 15 are electrically connected to terminals 11 and 12 of a capacitor 14 directly, in other words, without via any short bar. The DC link voltage direct detection unit 15 is connected to the DC link unit 13 without via any short bar, and thus voltages applied to both ends of the capacitor 14 of the DC link unit 13 can be detected without any influence of a short bar state.

The DC link voltage detection unit 930 according to the sixth embodiment is configured, as in the case of the DC link voltage detection unit 930 of the third embodiment, to detect a DC link voltage of the DC link unit 13 via short bars 41a to 41c and 42a to 42c.

The DC link voltage comparison unit 100 is configured to detect a short bar state by comparing a measurement result $V_{DC0}$ of a DC link voltage of the DC link voltage direct detection unit 15 with a measurement result $V_{DC}$ of a DC link voltage of the DC link voltage detection unit 930. In other words, in the case of $V_{DC}=V_{DC0}$, it can be determined that an abnormality has not occurred at the short bar. In the case of $V_{DC}\neq V_{DC0}$, it can be determined that an abnormality has occurred at the short bar.

Figure 13:
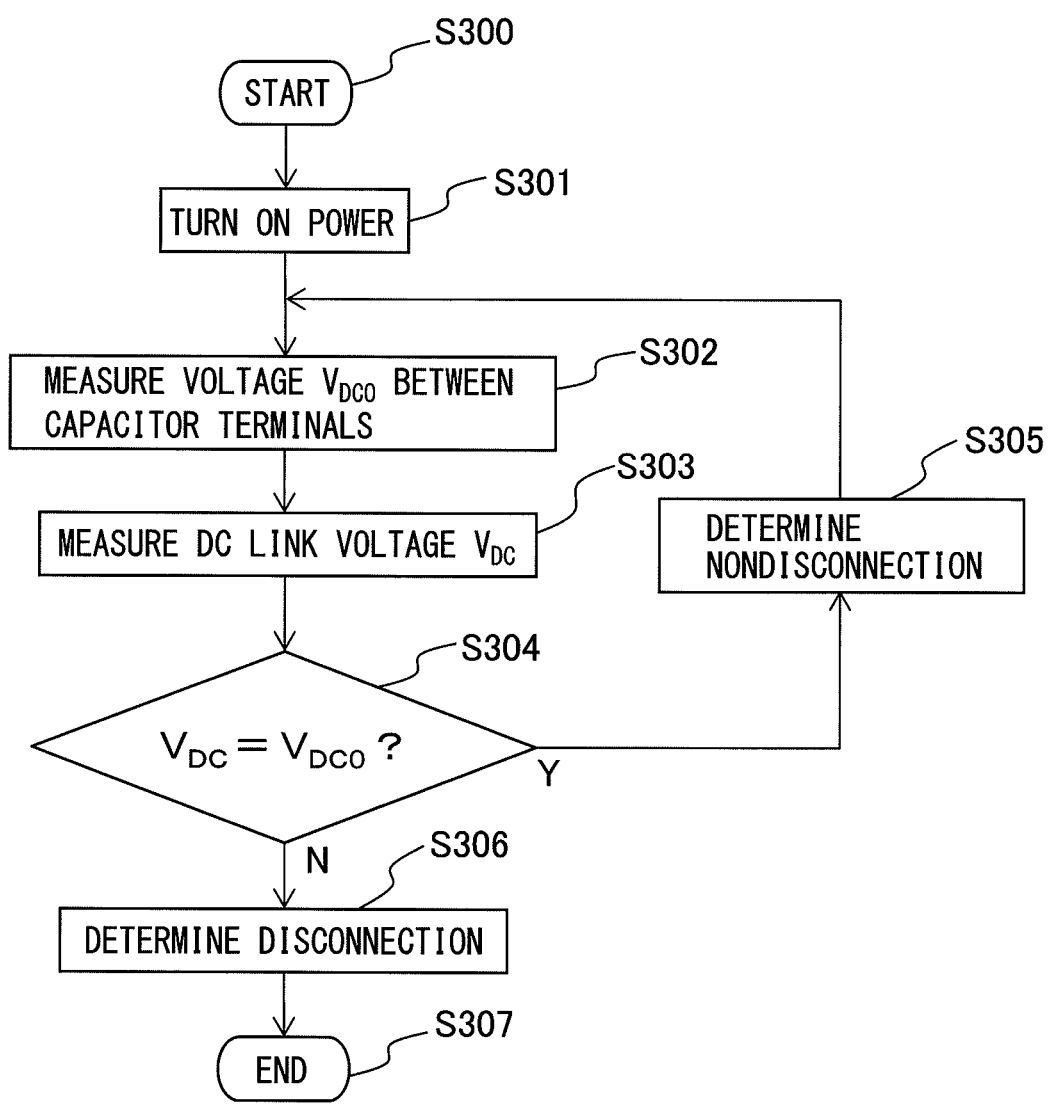
FIG. 13 is a flowchart illustrating an operation procedure of the motor driving apparatus according to the sixth embodiment of the present invention.

An operation procedure of the motor driving apparatus according to the sixth embodiment will be described in detail referring to a flowchart of FIG. 13. First, in step S301, power is turned ON for an AC power source 1 illustrated in FIG. 12 to activate the motor driving apparatus 106. In step S302, an inter-terminal voltage $V_{DC0}$ of the capacitor 14 is measured by using the DC link voltage direct detection unit 15. Then, in step S303, by using the DC link voltage detection unit 930, a DC link voltage $V_{DC}$ that is a voltage between the terminals 11 and 12 of the DC link unit 13 via the short bars 41a to 41c and 42a to 42c is measured.

Then, in step S304, the DC link voltage comparison unit 100 determines whether $V_{DC}=V_{DC0}$ has been set. In the case of $V_{DC}=V_{DC0}$ (YES in step S304), in step S305, it is determined that no short bar disconnection has occurred. Then, returning to step S302, the measurement of the DC link voltage is continued.

On the other hand, when the DC link voltage comparison unit 100 determines that $V_{DC}=V_{DC0}$ has not been set ($V_{DC}\neq V_{DC0}$) (NO in step 304), in step S306, it is determined that short bar disconnection has occurred. Then, in step S307, the measurement of the DC link voltage is ended.

A method for determining presence of short bar disconnection in the DC link voltage comparison unit 100 will be described in more detail. FIGS. 14A to 16C respectively depict temporal changes of the DC link voltage in a case where an abnormality has not occurred in the motor driving apparatus ("normal time"), power-outage time of the AC power source, and short bar disconnection time.

Figure 14A:
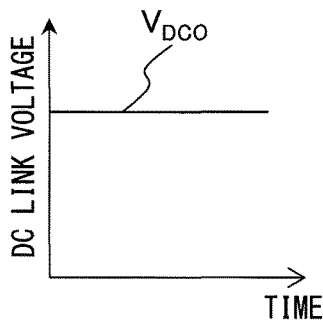
FIG. 14A is a graph depicting a temporal change of a DC link voltage detected by a DC link voltage direct detection unit at normal time by using the motor driving apparatus according to the sixth embodiment of the present invention.
Figure 14B:
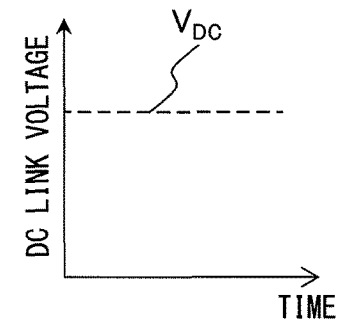
FIG. 14B is a graph depicting an example of a temporal change of a DC link voltage detected by a DC link voltage detection unit disposed in an N-th inverter at normal time by using the motor driving apparatus according to the sixth embodiment of the present invention.
Figure 14C:
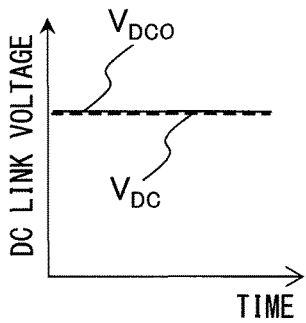
FIG. 14C is a graph depicting an example of a temporal change of a DC link voltage detected by the DC link voltage direct detection unit and the DC link voltage detection unit disposed in the N-th inverter at normal time by using the motor driving apparatus according to the sixth embodiment of the present invention.

First, a determination method in the case where no abnormality has occurred ("normal time") will be described. As depicted in FIG. 14A, in the case where an abnormality has not occurred, a DC link voltage $V_{DC0}$ measured by the DC link voltage direct detection unit 15 is set to a constant value irrespective of a passage of time. As depicted in FIG. 14B, a DC link voltage $V_{DC}$ detected by the DC link voltage detection unit 930 installed in an N-th inverter unit 90 is set to a constant value irrespective of a passage of time. As a result, as depicted in FIG. 14C, the DC link voltage comparison unit 100 determines that there is no difference between $V_{DC0}$ and $V_{DC}$ ($V_{DC0}=V_{DC}$), and it can be determined that no short bar disconnection has occurred.

Figure 15A:
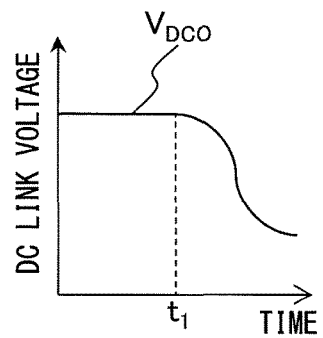
FIG. 15A is a graph depicting an example of a temporal change of a DC link voltage detected by the DC link voltage direct detection unit at power-outage time by using the motor driving apparatus according to the sixth embodiment of the present invention.
Figure 15B:
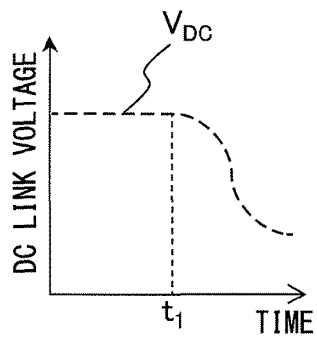
FIG. 15B is a graph depicting an example of a temporal change of a DC link voltage detected by the DC link voltage detection unit disposed in the N-th inverter at power-outage time by using the motor driving apparatus according to the sixth embodiment of the present invention.
Figure 15C:
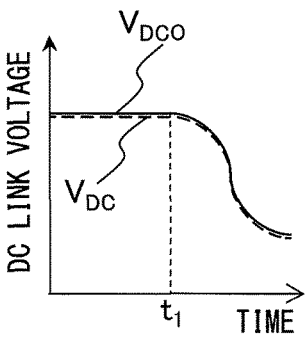
FIG. 15C is a graph depicting an example of a temporal change of a DC link voltage detected by the DC link voltage direct detection unit and the DC link voltage detection unit disposed in the N-th inverter at power-outage time by using the motor driving apparatus according to the sixth embodiment of the present invention.

Next, a determination method in the case where power has been cut for the AC power source will be described. As depicted in FIG. 15A, supposing that power is cut at time $t_1$, a DC link voltage $V_{DC0}$ measured by the DC link voltage direct detection unit 15 exhibits a constant value until the time $t_1$. However, after the time $t_1$, a voltage applied to the capacitor 14 is gradually discharged, and thus the DC link voltage $V_{DC0}$ falls with time. As depicted in FIG. 15B, a DC link voltage $V_{DC}$ detected by the DC link voltage detection unit 930 installed in the N-th inverter unit 90 similarly exhibits a constant value until the time $t_1$. However, after the time $t_1$, the voltage applied to the capacitor 14 is gradually discharged, and thus the DC link voltage $V_{DC}$ falls with time. In this case, as depicted in FIG. 15C, the DC link voltage comparison unit 100 determines that there is no difference between $V_{DC}$ and $V_{DC0}$ ($V_{DC}=V_{DC0}$) because they similarly change, and it can be determined that no short bar disconnection has occurred.

Figure 16A:
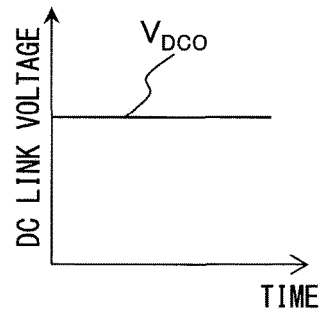
FIG. 16A is a graph depicting an example of a temporal change of a DC link voltage detected by the DC link voltage direct detection unit at short bar disconnection time by using the motor driving apparatus according to the sixth embodiment of the present invention.
Figure 16B:
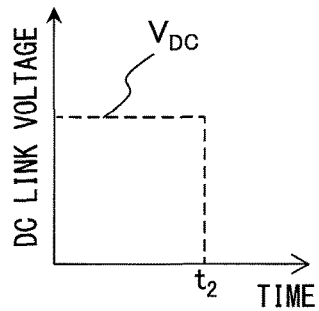
FIG. 16B is a graph depicting an example of a temporal change of a DC link voltage detected by the DC link voltage detection unit disposed in the N-th inverter at short bar disconnection time by using the motor driving apparatus according to the sixth embodiment of the present invention.
Figure 16C:
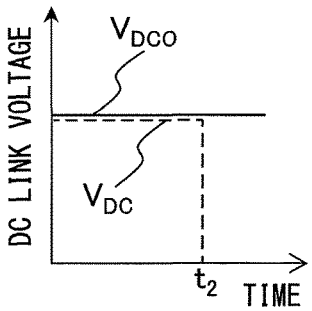
FIG. 16C is a graph depicting an example of a temporal change of a DC link voltage detected by the DC link voltage direct detection unit and the DC link voltage detection unit disposed in the N-th inverter at short bar disconnection time by using the motor driving apparatus according to the sixth embodiment of the present invention.

Next, a determination method in the case where short bar disconnection has occurred will be described. As depicted in FIG. 16A, the disconnection occurs at the short bars connected to the terminals 11 and 12 of the DC link unit 13. Accordingly, even when the shot bar disconnection has occurred, a DC link voltage $V_{DC0}$ measured by the DC link voltage direct detection unit 15 exhibits a constant value irrespective of a passage of time. As depicted in FIG. 16B, supposing that short bar disconnection has occurred at time $t_2$, a DC link voltage $V_{DC}$ detected by the DC link voltage detection unit 930 installed in an N-th inverter unit 90 exhibits a constant value until time $t_2$. However, after the time $t_2$, no more voltage is applied from the DC link unit 13, and thus the DC link voltage $V_{DC}$ steeply falls to 0 [V]. In this case, as depicted in FIG. 16C, the DC link voltage comparison unit 100 can determine that $V_{DC}$ is equal to $V_{DC0}$ until the time $t_2$. However, after the time $t_2$, $V_{DC}$ and $V_{DC0}$ greatly differ from each other, and thus it can be determined that short bar disconnection has occurred.

As described above, by disposing the DC link voltage comparison unit 100 configured to compare the DC link voltage $V_{DC0}$ measured by the DC link voltage direct detection unit 15 directly connected to the DC link unit 13 with the DC link voltage $V_{DC}$ detected by the DC link voltage detection unit 930 via the short bars 41a to 41c and 42a to 42c, the short bar disconnection can be easily detected.

The example where the converter unit and the inverter unit are arranged in independent casings and interconnected by using the short bars provided outside the casings has been described. However, not limited to this example, the present invention can be applied to a case where the converter unit and the inverter unit are arranged in the same casing and connected to each other in the casing.

As described above, according to the present invention, by detecting the state of the DC link voltage at the short bar or the inverter unit, disconnection of the short bar for supplying the DC link voltage can be detected.

What is claimed is:

1. A motor driving apparatus comprising:
 a converter unit configured to convert an AC voltage into a DC voltage;
 a DC link unit configured to smooth the DC voltage by a capacitor to generate a DC link voltage;
 multiple inverter units configured to convert the DC link voltage into a multiphase AC voltage for motor driving;
 multiple pairs of short bars configured to electrically interconnect terminals of the DC link unit and terminals of the multiple inverter units; and
 multiple DC link voltage detection units, each DC link voltage detection unit being connected to a corresponding inverter unit and configured to detect the DC link voltage at the corresponding inverter unit, so as to detect whether one of the short bars that connects the corresponding inverter unit to the DC link unit has been disconnected,
 wherein at least parts of the multiple pairs of short bars are located between the terminals of the DC link unit and terminals of the multiple DC link voltage detection units, and wherein the converter unit and the inverter unit are arranged in independent casings and interconnected by using the short bars provided outside the casings.

2. The motor driving apparatus according to claim 1, wherein at least one terminal of the multiple DC link voltage detection units is connected to at least one of the multiple pairs of short bar.

3. The motor driving apparatus according to claim 1, wherein at least one of the multiple DC link voltage detection units includes a unit configured to detect a temporal change of the DC link voltage.

4. The motor driving apparatus according to claim 1, further comprising:
 a DC link voltage direct detection unit directly connected to the DC link unit and configured to measure the DC link voltage; and
 a DC link voltage comparison unit configured to compare a measurement result of the DC link voltage direct detection unit with a measurement result of at least one of the multiple DC link voltage detection units.

* * * * *